United States Patent [19]

Sladky

[11] Patent Number: 5,068,503

[45] Date of Patent: Nov. 26, 1991

[54] HIGH-PRESSURE SENSOR FOR FLUID CONDITIONS AND METHOD AND APPARATUS USING SAME

[76] Inventor: Hans Sladky, Wischhofstieg 7, 2000-Hamburg 65, Fed. Rep. of Germany

[21] Appl. No.: 381,113

[22] Filed: Jul. 17, 1989

[30] Foreign Application Priority Data

Apr. 11, 1989 [DE] Fed. Rep. of Germany ....... 3911795

[51] Int. Cl.$^5$ .................... G01L 9/10; H01H 35/40
[52] U.S. Cl. ............................. 200/83 L; 73/722; 200/835
[58] Field of Search ............. 200/83 L, 83 A; 73/722, 73/716

[56] References Cited

U.S. PATENT DOCUMENTS

| | | | |
|---|---|---|---|
| 2,339,847 | 1/1944 | Ellison | 200/83 W |
| 2,444,163 | 6/1948 | Kocmich | 200/83 L |
| 2,742,544 | 4/1956 | Lovick | 200/83 W |
| 3,042,769 | 7/1962 | Campbell | 200/83 L |
| 3,368,173 | 2/1968 | Wolford | 200/83 L |
| 3,786,211 | 1/1974 | Popp | 200/83 L |
| 3,898,403 | 8/1975 | Grayson et al. | 200/83 L X |

FOREIGN PATENT DOCUMENTS

0279390 8/1988 European Pat. Off. .......... 200/83 A

Primary Examiner—William E. Wayner
Attorney, Agent, or Firm—Lerner, David, Littenberg, Krumholz & Mentlik

[57] ABSTRACT

A sensor or regulator capable of operating at high absolute pressures and for measurement of pressure, especially pressure differential, or liquid level, is disclosed and has a member which moves in response to pressure differential and being coupled directly to a diaphragm via a lever linkage or which is displaceable by a float and which is juxtaposed with an inductive proximity switch responsive to movement of the member where the proximity switch can be mounted directly in a pressure-retentive wall, a sight glass or like pressurizable partition partition need not be provided. In the preferred construction, however, such a glass, sealed in the pressure wall of the housing, is interposed between the inductive proximity switch and the movable member to which that proximity switch responds. A method of controlling oil/refrigerant mixtures in a refrigerating plant is also disclosed.

18 Claims, 4 Drawing Sheets

PRIOR ART

HIGH-PRESSURE SENSOR FOR FLUID CONDITIONS AND METHOD AND APPARATUS USING SAME

FIELD OF THE INVENTION

My present invention relates to a sensor for a fluid condition in high-pressure or low-pressure applications. The invention also relates to an oil concentration regulator for a flooded evaporator and to a method of controlling oil concentration in a flooded evaporator.

BACKGROUND OF THE INVENTION

In my earlier U.S. Pat. No. 4,540,016 issued Sept. 10, 1985, U.S. Pat. No. 4,488,571 issued Dec. 18, 1984 and U.S. Pat. No. 4,799,542 issued Jan. 24, 1989, I have described a flooded evaporator system in which a refrigerant is employed together with oil so that control of the oil concentration in the flooded evaporator is important. In more general terms, however, the flooded evaporator is representative of systems which can be controlled or monitored utilizing a sensor which can respond to a parameter or condition of a liquid and which may be subject to high pressures.

For example, pressure switches of earlier designs can make use of a membrane which can be subjected to a one-sided or differential pressure and transmit movement, e.g. via a rod to a device responsive to such movement. Lever systems may be coupled between the rod and, for example, a switch which a pressure state may actuate. Float switches can respond to liquid level and likewise can transmit motion via a rod.

When, however, such devices are utilized in pressure environments, it is important to seal the device against leakage and in such fashion as to withstand the high pressures which may develop. It is not uncommon, for example, to surround the rod with O-ring-type seals, gland seals or the like, to ensure pressure tightness at high pressures.

However, these constructions create a variety of problems. Firstly, friction-type seals around a rod inherently reduce sensitivity because of the friction force retarding movement. Secondly, with certain friction seals like gland seals and O-rings, the friction force is not constant and varies with the pressure to which the sea is subject.

Accordingly, it is desirable to provide a sensor which is free from these disadvantages of earlier sealed systems.

With respect to refrigeration plants and the like, mention may be made of the fact that every refrigeration apparatus comprises two interrelated circulations. A first circulation is provided for a refrigerator and extends from an evaporator (initially in a vapor form) via a liquid separator, a heat exchanger, the compressor, an oil separator and the condenser to return to the evaporator. A second circulation is provided for the lubricating oil which is required by the compressor and as to which a certain concentration must be present in the refrigerant supplied to the compressor and is, therefore, also present in the refrigerant leaving the compressor. This oil is recovered at the oil separator and must be fed back to the refrigerant. A flooded evaporator may have its oil concentration controlled therein by a oil concentration regulator.

I have found that a certain oil content in the refrigerant can even improve the evaporator heat exchange as long as this oil concentration is not excessive. Generally, the oil concentration should be 5 to 20%.

To prevent an excessive increase in the oil concentration in the refrigerant boiling of the evaporator and, therefore, problems with insufficient oil in the compressor, flooded evaporator systems can operate with a recycle of oil-enriched refrigerant from the evaporator to the compressor.

To supply a mixture free from liquid refrigerant and consisting of refrigerant vapor and oil droplets to the compressor, this mixture is supplied via a heat exchanger to the suction intake of the compressor. The high-pressure liquid from the condenser heats the mixture to evaporate any residual liquid component of the refrigerant so that only the refrigerant vapor and oil will be supplied to the compressor.

While oil deficiency in the compressor is thereby avoided, the oil concentration in the evaporator is found to depend on a variety of operating conditions, for example evaporation pressure and fluctuations in evaporator output, flow velocities and the like s that oil concentration variations can detrimentally affect the overall operation of the system.

OBJECTS OF THE INVENTION

It is, therefore, an important object of the invention to provide an improved sensor for a condition of a fluid which is free from the drawbacks of earlier sensors, detectors or regulators, especially with respect to pressure or level sensors.

Another object of my invention is to provide an improved sensor for the purposes described or for other purposes which can be used in a high-pressure or low-pressure environment without the drawback of increasing friction resulting from the application of pressure to seals or the like.

Still another object of the invention is to provide an improved method of controlling oil concentration in a refrigeration system.

It is also an object of this invention to provide an oil concentration regulator for flooded evaporators which represents an advance over earlier unregulated systems.

SUMMARY OF THE INVENTION

These objects and others which will become more apparent hereinafter are attained, in accordance with the present invention, firstly, in a sensor for a pressurized fluid which comprises:

a housing receiving at least one fluid under a different from atmospheric pressure (usually a superatmospheric pressure) and provided with a pressure-retaining wall formed with an opening;

a pressure-resistant glass window sealingly received on the wall and closing the opening, the glass window separating the pressure chamber within the housing from an atmospheric pressure space;

a member displaceable toward and away from the window and positioned in the chamber to indicate by displacement of the member a physical condition of the fluid in the chamber; and a contactless proximity switch mounted on the wall, juxtaposed with the window and responsive to a position of the member for signalling the physical condition of the fluid in the chamber. Preferably, the contactless proximity switch is an inductive priximity switch, although it can be a photocell, magnetic receiver, capacitative proximity switch or the like.

The physical condition of the fluid may be a liquid level and the member displaceable in response to that physical condition can be a float.

For control of a refrigeration system in accordance with the principles which are to be outlined below, however, the physical condition is at least one pressure and the member can be operatively connected to a membrane having at least one side subjected to fluid pressure. Advantageously, the housing is a membrane housing defining pressurizable chambers on opposite sides of the membrane, one of these chambers being connected to one fluid pressure while the other fluid chamber is connected to another fluid pressure so that the membrane is displaced in response to a pressure differential thereacross.

According to a feature of the invention, the membrane can be a bar juxtaposed directly with the inductive proximity switch, while in a variant of the sensor of the invention, the membrane can act upon a lever whose motion can be detected by the inductive proximity switch which, in that case, does not have to be aligned with the aid of the membrane.

It will be appreciated that the seal, in the cases described, between the high pressure side and the ambient pressure side is provided by the window which can be glass and sealed in place by any conventional means for the high-pressure sealing of sight glasses in high-pressure apparatus.

It is also possible, in accordance with the present invention, to omit the glass, provided, of course, that the inductive proximity switch itself can sustain the high pressures used and can be sealingly mounted in the wall of the housing subject to pressure.

The sensor of the invention can thus be used in a control method for controlling a composition. This method according to the invention, controls a composition formed by continuous mixing of two liquid streams under pressure and by feeding at least one of the liquid streams to a mixing location throughout at least one control valve having a valve member whose position controls the composition of the mixture.

The method thus comprises the steps of:

applying to one side of a member displaceable under a pressure differential, a pressure of the mixture under a given set of physical conditions of the mixture;

applying to another side of the member a pressure of a pure component of the mixture at the given set of physical conditions, thereby subjecting the member to a pressure differential representing the composition of the mixture and correspondingly displacing the member;

detecting a displacement of the member; and regulating the control valve in accordance with the detected displacement of the member.

The displacement of the member is detected across a pressure retentive wall, e.g. the aforementioned sight glass, using the inductive proximity sensor or switch and preferably the two pressures are respectively a vapor pressure of the pure component and a vapor pressure of the mixture, respectively. Advantageously, to ensure that the two vapor pressures are applied at the same temperature to the opposite sides of the membrane, the fluid passages for applying the vapor pressures to the regulator are at the same level as the cartridge. In a preferred embodiment of the invention, the mixture is a refrigerant/oil mixture formed in a refrigeration plant and the valve controls an oil concentration therein, the mixture being formed at the location by mixing practically pure refrigerant withdrawn from a separator of an evaporator of the refrigeration plant with a liquid mixture of refrigerant and oil withdrawn from the separator or at an earlier site, and the rate at which the liquid mixture of refrigerant and oil is fed to the location is controlled by the valve.

In this refrigeration system, at least part of the oil recovered in an oil separator is recycled through a control valve to the evaporator and the latter control valve is controlled with the same controller as regulated the rate at which the refrigerant/oil mixture is fed to the location.

In apparatus terms, the system for automatically controlling a composition formed by continuous mixing of two liquid streams under pressure and by feeding at least one of the streams to a mixing location comprises:

at least one control valve having a valve member whose position controls the composition of the mixture;

means for applying to one side of a member displaceable under a pressure differential a pressure of the mixture under a given set of physical conditions of the mixture;

means for applying to another side of the member a pressure of a pure component of the mixture at the given set of physical conditions, thereby subjecting the member to a pressure differential representing the composition of the mixture and correspondingly displacing the member;

means for detecting a displacement of the member; and means responsive to the detecting means for regulating the control valve in accordance with the detected displacement of the member.

With respect to a refrigeration system, therefore, the invention overcomes drawbacks of earlier systems by utilizing the vapor pressures of the pure component and of the mixture of the refrigerant and oil as inputs to a differential pressure sensor which comprises a switch holding one valve open while another is closed and vise versa. One can thus ensure that the oil concentration in the evaporator will not exceed a certain maximum value over any excessive period of time and thus will not contribute to an oil deficiency in the compressor. A significant reduction of the oil concentration in the evaporator below the optimal value thereof can be prevented by closing the valve for withdrawing the refrigerant/oil mixture at excessively low oil concentrations to allow the oil concentration to build up again.

The differential pressure sensor of the invention has been found to be particularly effective in the measurement of small pressure differences at high absolute pressures. In the case described, for example, the pressure differences can amount to a maximum of several mbar while the absolute working pressure can be many bars. In the case of a refrigerating system, as described, the apparatus must withstand the working pressures of boiling refrigerant and thus an external temperature of $+40°$ C., for example, and about 12 mbar. The controller of the invention has been tested in practice and can be sensitive to a pressure differential under these and higher pressures, of less than 1 mbar).

The membrane, of course, which responds to this pressure differential must have a large area and high flexibility and is subjected uniformly over both its surfaces to the respective pressures. This requires that the membrane be held between two housing plates which are rigid under the pressures applied to prevent excessive distortion of the membrane. I have found that its maximum stroke until it engages the higher or lower wall, should be 1 mm and the inductive proximity switch should, therefore, be sensitive to movements of a maximum of about 1 mm. Indeed, an inductive proximity switch can be sensitive to displacements of 1 mm or less. Of course, a low friction lever system can be used to multiply the displacement provided by the membrane in a less preferred construction of the invention.

BRIEF DESCRIPTION OF THE DRAWING

The above objects, features and advantages of my invention will become more readily apparent from the following description, reference being made to the accompanying drawing in which.

SPECIFIC DESCRIPTION

Figure 1:
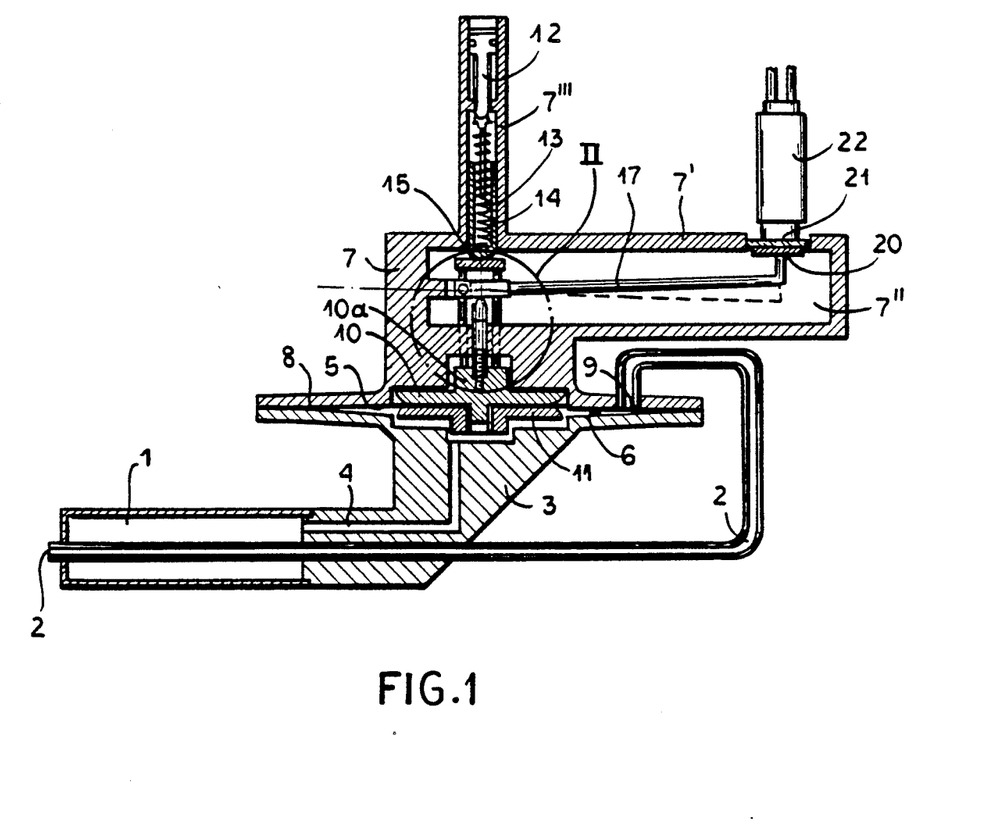
FIG. 1 is an axial section taken in a vertical plane through an oil concentration regulator for a flooded evaporator.
Figures 2, 3:
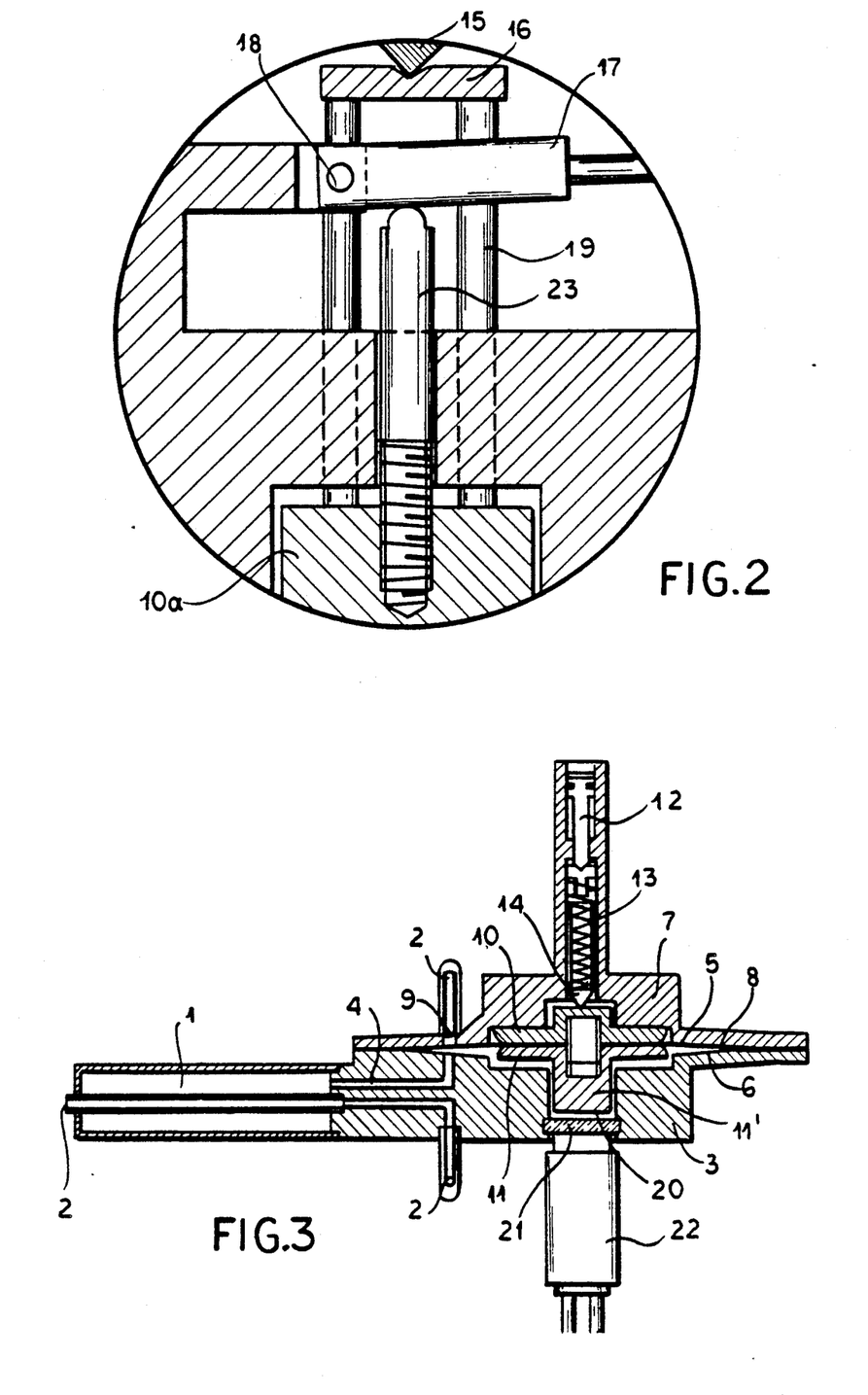
FIG. 2 is a detail view of the regulator II of FIG. 1.
FIG. 3 is a section similar to that shown in FIG. 1 through a pressure responsive device without a motion multiplying lever and representing a best mode embodiment of the invention.

Referring first to FIGS. 1 and 2 which show a controller utilizing an inductive proximity switch, it can be seen that the cartridge 1 containing the pure refrigerant surrounds the pipe 2 which conveys the vapor pressure of the refrigerant/oil mixture to the regulator and thus constitutes the pressure sensitivity of the regulator. Since the cartridge 1 is coaxial with the tube 2, the pure refrigerant and the vapor of the refrigerant/oil mixture are at the same temperature so that the vapor pressures applied to the regulator membrane are also at the same temperature.

A membrane 5 is sandwiched between a lower membrane housing 3 and an upper membrane housing 7 so that the lower contact surface 6 limits movement of the membrane downwardly while the upper contact surface 8, against which the membrane lies as shown in FIG. 1, limits upward movement of the membrane.

The pure refrigerant vapor pressure is thus applied to the underside of the member 5 while the vapor pressure of the refrigerant/oil mixture is applied to the upper surface of the membrane 5. In the illustrated embodiment, the total axial movement of the membrane which has a diameter of 100 mm, is 0.8 mm in both directions.

The upper membrane housing 7 is formed with a port 9 at which the duct 2 opens.

The membrane is also held between an upper membrane holding plate 10 and a lower membrane holding plate 11, fixed centrally to the membrane and providing it with requisite stiffness for the axial movement described. The lower plate 10 has a central cylindrical boss 10a in which a pin 23 is threaded.

With an increase in the pressure differential resulting in an upward movement of the membrane, the plate 10 displaces the pin 23 upwardly to pivot a light lever 17 about a pivot axis or fulcrum 18 to multiply the small stroke (0.8 mm) of the pin.

At the end of the longer lever arm of the lever 17 a small steel or other ferromagnetic plate 20 is provided which can move toward and away from a pressure resisting window 21 sealingly mounted in a pressure retaining wall 7' of the housing. Since the chamber 7" on the housing is also subjected to the absolute pressure applied to the membrane, i.e. there is no seal around the pin 23, wall 7' and the glass plate or window 21 are subjected to high pressure. However, the inductive proximity switch 22, which is juxtaposed with the plate 20 across the glass window 21 is located externally of the chamber 7" and at ambient pressure. No friction seal varying its friction force with pressure, therefore, is interposed along the path of displacement from the membrane to the plate 20. The inductive proximity switch 22 can have a normally closed and normally open contact which are switched when the plate 20 moves toward or away from the proximity switch.

Pressure differentials in the relatively wide range of 0.5 to 15 mbar can thus be detected with great precision and absolute pressures of 12 bar or greater without variation in the response as would be the case if a pressure seal surrounded the pin 23 or any of the other mechanically moving parts of the device.

To adjust the response of the regulator, a setting screw 12 can be rotated in an extension 7''' of the housing to control the force delivered by a compression spring 13 exerting a force via the pin 15 and the spring guide 14 upon a bridge 16 whose pins 19 transfer this force to the boss 10a (FIG. 2). In the illustrated embodiment, four such pins 19 are provided.

The spring force thus adds to the vapor pressure of the refrigerant/oil mixture applied to the upper surface of the membrane.

The embodiment of FIG. 3 differs from that of FIGS. 1 and 2 in that the lever system 17 and the steel plate 20 are eliminated and rather than having the inductive proximity switch 22 located at an axis spaced from but parallel to the axis of the membrane, the inductive proximity switch 22 is juxtaposed across the glass window 21 directly with a boss 11' of the lower plate 11 which forms the steel member 20 to which the proximity switch responds. The use of the regulator illustrated in FIGS. 1 and 2 or the regulator of FIG. 3 is described in greater detail in connection with the diagrams of FIGS. 4 and 5 which show the regulator as controlling the concentration in the evaporator of a refrigeration apparatus.

Figure 4:
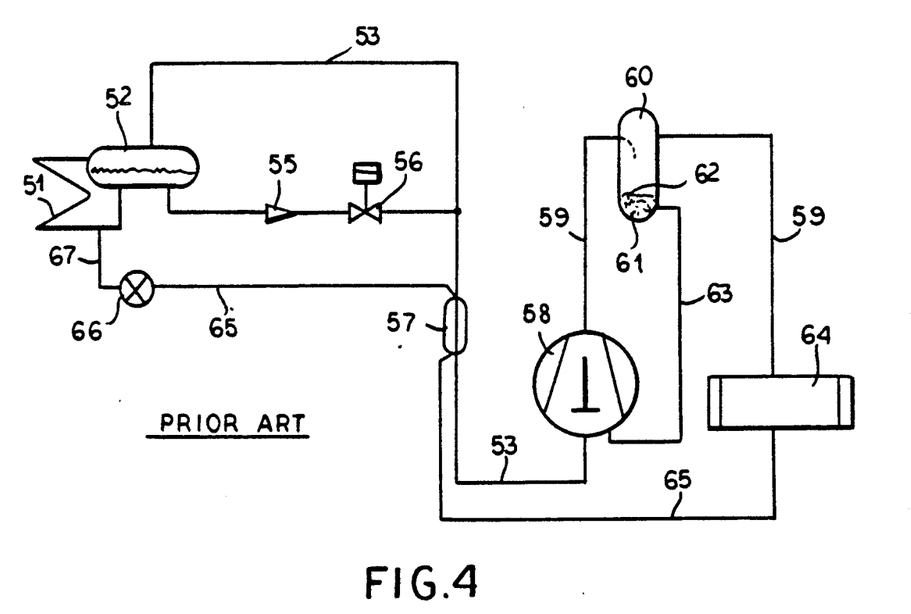
FIG. 4 is a flow diagram of a prior art process showing flow patterns in a refrigeration system.
Figure 5:
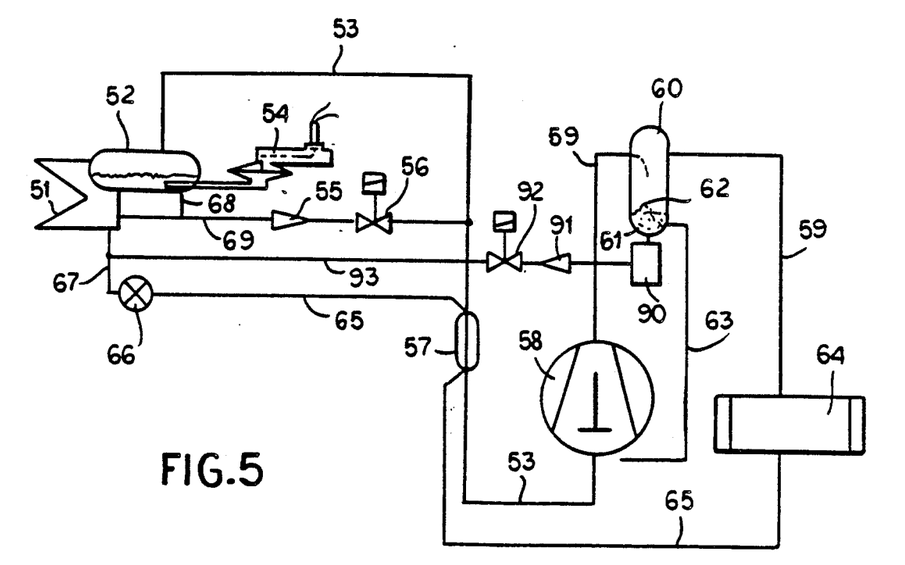
FIG. 5 is a diagram similar to FIG. 4 of a refrigeration system utilizing the regulator of the invention.

FIG. 4 is intended to illustrate the conventional process by which oil deficiencies in the compressor can be avoided, but the oil concentration in the evaporator is not controlled. FIG. 5 shows how the oil concentration in the evaporator can also be controlled.

In FIGS. 4 and 5, the evaporator 51 is shown to be provided with a liquid separator 52 which has its vapor space connected via the intake or suction line 52 with the compressor 58. Refrigerant vapor is thus drawn by the compressor from this evaporator.

With this flow of refrigerant vapor, line 69 or line 68 feed a refrigerant/oil mixture deriving directly from the evaporator 51 or from the liquid phase of the liquid separator 52.

Any droplets of the liquid refrigerant remaining in this mixture are eliminated in the heat exchanger 57 by indirect heat exchange with the warm liquid refrigerant derived from the condenser 64 so that such droplets are evaporated and a refrigerant droplet-free mixture is fed to the compressor 58.

Because of the centrifugal action of the compressor, a larger quantity of oil passe together with the superheated refrigerant resulting from the compression, into an oil separator 60 in which the greater part of the oil is collected in a liquid state.

The refrigerant vapor leaving the separator 60 and partly free from oil is fed via conduit 59 into the water or direct cooled condenser 64.

The oil level in the separator 60 may be controlled via a float 62 which forms the boundary between the high pressure and low pressure parts of this separator. Oil is fed via line 63 to the compressor 58.

In the condenser 64, the refrigerant vapor condensers and together with dissolved oil which is not separated out in the separator 60, passes via line 65 to the heat exchanger 57 and from the latter to the expansion valve 66 as a high-pressure liquid.

The expanding vapor and liquid is returned via the low-pressure line 67 to the evaporator.

The system of the invention, represented in FIG. 5, differs substantially from the prior art system illustrated in FIG. 4, firstly, in that a control valve 56 is provided and is operatively connected to the regulator 54 which may be the regulator of FIGS. 1 and 2 or the regulator of FIG. 3. This regulator has its sensors 1 and 2 preferably in the liquid phase of the liquid separator 52 as illustrated. The regulator 54 is so set at a value of the oil concentration which is below the optimum, a signal is generated to close the control valve 56 and when a somewhat higher oil concentration is attained, a signal is given to reopen this valve.

In this fashion, the oil concentration in the evaporator can be regulated within a relatively narrow range so that an optimal value is maintained.

With a drop in the oil concentration below the optimal value, the control valve 56 blocks the drain of refrigerant/oil mixture and this allows a build up of the oil concentration. Upon a rise in the oil concentration above the optimal value, flow is permitted to allow the refrigerant/oil mixture to pass as described in connection with the flow diagram of FIG. 4.

A second improvement over the prior art is also represented in FIG. 5 since FIG. 5 shows a further control valve 92 in a feedback path 93 which, in the case of an excessively low oil content in the evaporator 51, can feed the oil directly from the oil separator 60 to the evaporator. This greatly reduces the intervals between opening and closing of the main valve 56 and thus fluctuation of the oil concentration in the evaporator.

The control valve 92 receives its opening pulse from the same regulator 54 via a changeover of contacts so that the valve 92 is always closed when the valve 56 is open and vise versa. Elements 55 and 91 are flow throttles controlling respectively the flows of the refrigerant/oil mixture and the recycled oil.

The oil fed back from the separator 60 can be collected first in an oil supply vessel 90 at the pressure side of the oil separator and which ensures that only liquid oil, rather than a mixture of oil and refrigerant will be fed back.

The apparatus of FIG. 3 can be used in precisely the same way as FIGS. 1 and 2 to provide the control pulses for the valves 56 and 92.

Figure 6:
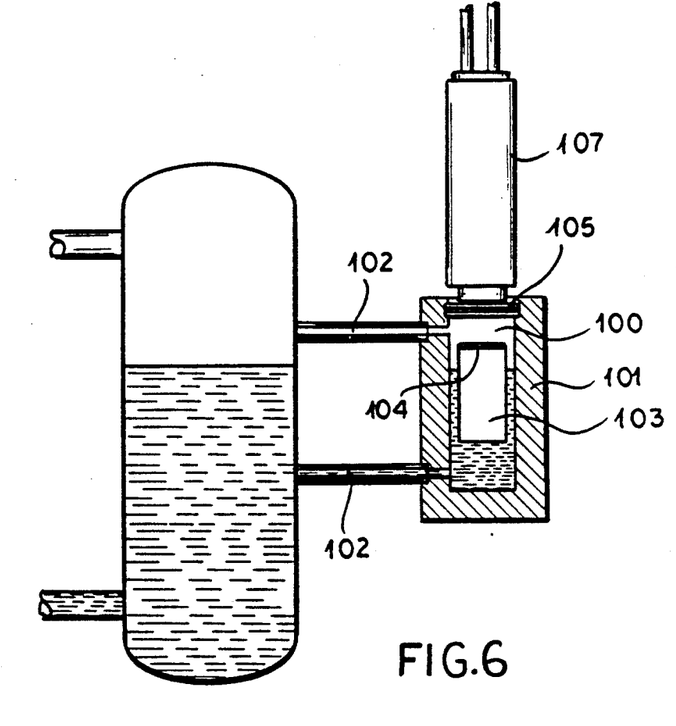
FIG. 6 is an axial section through a float switch utilizing principles of the invention.

In FIG. 6, I have shown a float switch which can be used, for example, to respond to the level of oil in the separator 60 or wherever a liquid level control is required. For example, a level in a chamber 100 of a pressurizable housing 101 is detected. The chamber is connected to the pressure vessel by the conduits. A float 103 is displaceable in the chamber 100 and is provided at its upper end with a steel plate 104. A glass window 105 is sealingly fitted into a member 106 threaded into the housing 101 and juxtaposed with the steel plate 104 across this window, in an inductive proximity switch 107 of the type described earlier.

Since the inductive proximity switch is sensitive only to slight movement of the float, it provides high precision for control of the level of liquid or control of some other parameter in response to a liquid level. Note that a friction seal sensitive to pressure is not present in this embodiment either.

Figure 7:
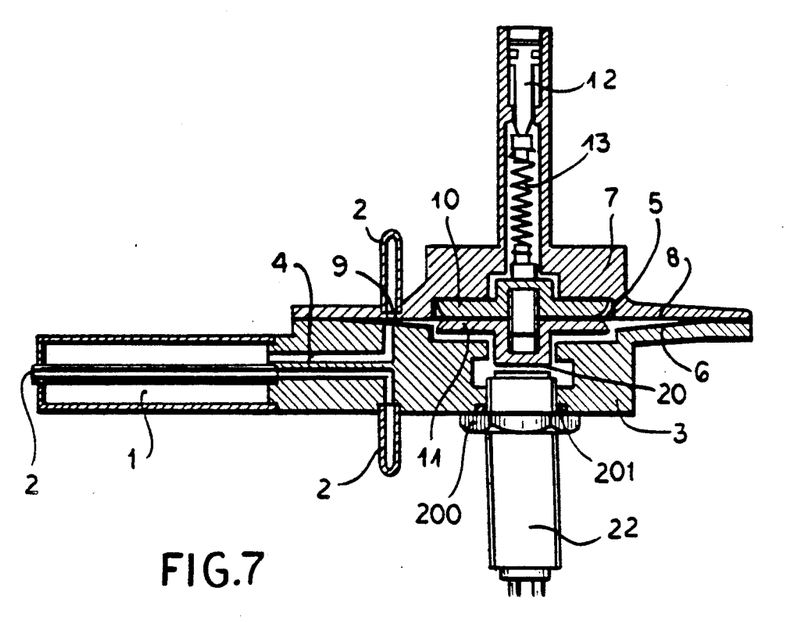
FIG. 7 is a diagram in the form of an axial section, showing still another embodiment of the invention.

FIG. 7 illustrates a system which is generally similar to that of FIG. 3 and which therefore comprises a membrane 5 sandwiched between upper and lower housing parts 7 and 3.

More specifically, I have shown in FIG. 7, a system in which the movable member 20 connected to the diaphragm 5 and sandwiched between the parts 10 and 11 as in FIG. 3, is biased by a spring 13, the compression of which can be controlled by a screw 12.

However, instead of having a glass plate interposed between the member 20 and the inductive proximity switch 22, the latter is threaded into the housing 3 and is sealed therein with the aid of a nut 200 and an O-ring 201 so that the end of the proximity switch 22 is juxtaposed directly with the member 20. Thus the embodiment of FIG. 7 operates similarly to that of FIG. 3, although the pressure-tight sealing of the inductive proximity switch 22 in this embodiment eliminates any need for a glass between the sensor 22 and the moving member 20.

I claim:

1. A pressure sensor comprising an upper housing having an upper membrane contact surface, a lower housing having a lower membrane contact surface, said upper and lower housings joined to provide a chamber therebetween, a flexible membrane within said chamber having a circumferential portion clamped between the joined upper and lower housings, an upper membrane holding plate and a lower membrane holding plate centrally attached to opposite sides of said membrane, said upper housing including a recess for receiving said upper membrane holding plates upon upward deflection of said membrane, said upper membrane contact surface limiting the maximum upward movement of said membrane by contact therewith and said lower membrane contact surface limiting the maximum downward movement of said membrane by contact therewith, means for applying respective pressures to opposite sides of said membrane whereby said membrane is displaced between said upper and lower membrane contact surfaces by a pressure differential thereacross, a member connected to said membrane for movement thereby in response to the pressure differential across said membrane, and a proximity switch mounted on one of said housings spaced juxtaposed said member, said switch responsive to the movement of said member by said membrane to provide an output indicative of the pressure differential across said membrane.

2. The pressure sensor of claim 1, wherein said lower membrane contact surface and said upper membrane contact surface are arranged in spaced apart relationship forming a portion of said chamber.

3. The pressure sensor of claim 1, wherein said lower housing includes a recess for receiving said lower membrane holding plate upon downward deflection of said membrane.

4. The pressure sensor of claim 1, wherein said member comprises a portion of one of said holding plates.

5. The pressure sensor of claim 1, wherein said proximity switch comprises an inductive proximity switch.

6. A pressure sensor comprising an upper and lower housing joined to provide a chamber therebetween, a flexible membrane within said chamber having a circumferential portion clamped between the joined upper and lower housings, means for applying respective pressure to opposite sides of said membrane whereby said membrane is displaced by a pressure differential thereacross, a member spaced from said housings and connected to said membrane for movement thereby within said chamber in response to the differential pressure across said membrane, and a contactless proximity switch mounted on one of said housings and having a portion extending into said chamber, said portion of said switch being unconnected and spaced juxtaposed said member, said switch responsive to the movement of said member while said portion of said switch remains unconnected and spaced therefrom within said chamber to provide an output indicative of the pressure differential across said membrane.

7. The pressure sensor of claim 6, wherein said one of said housings includes an opening through which said portion of said switch extends into said chamber.

8. The pressure sensor of claim 1, further including sealing means for providing a pressure tight seal between said proximity switch and said housing.

9. The pressure sensor of claim 8, wherein said contactless proximity switch includes another portion extending from said sealing means outwardly of said housings within ambient pressure.

10. The pressure sensor of claim 6, wherein said member is located within the center of said membrane.

11. The pressure sensor of claim 6, wherein said lower housing includes a lower membrane contact surface and said upper housing includes an upper membrane contact surface arranged in spaced apart relationship forming a portion of said chamber.

12. The pressure sensor of claim 11, further including an upper membrane holding plate and a lower membrane holding plate centrally attached to opposite sides of said membrane.

13. The pressure sensor of claim 12, wherein said member includes a portion of one of said holding plates.

14. The pressure sensor of claim 12, wherein said upper housing includes a recess for receiving said upper membrane holding plate upon upward deflection of said membrane.

15. The pressure sensor of claim 12, wherein said lower housing includes a recess for receiving said lower membrane holding plate upon downward deflection of said membrane.

16. A pressure sensor comprising an upper housing having an upper membrane contact surface, a lower housing having a lower membrane contact surface, said upper and lower housings joined to provide a chamber therebetween, a flexible membrane within said chamber having a circumferential portion clamped between the joined upper and lower housings, an upper membrane holding plate and a lower membrane holding plate centrally attached to opposite sides of said membrane, said lower housing including a recess for receiving said lower membrane holding plate upon downward deflection of said membrane, said upper membrane contact surface limiting the maximum upward movement of said membrane by contact therewith and said lower membrane contact surface limiting the maximum downward movement of said membrane by contact therewith, means for applying respective pressures to opposite sides of said membrane whereby said membrane is displaced between said upper and lower membrane contact surfaces by a pressure differential thereacross, a member connected to said membrane for movement thereby in response to the pressure differential across said membrane, and a proximity switch mounted on one of said housings spaced juxtaposed said member, said switch responsive to the movement of said member by said membrane to provide an output indicative of the pressure differential across said membrane.

17. A pressure sensor comprising an upper housing having an upper membrane contact surface, a lower housing having a lower membrane contact surface, said upper and lower housings joined to provide a chamber therebetween, a flexible membrane within said chamber having a circumferential portion clamped between the joined upper and lower housings, an upper membrane holding plate and a lower membrane holding plate centrally attached to opposite sides of said membrane, said upper membrane contact surface limiting the maximum upward movement of said membrane by contact therewith and said lower membrane contact surface limiting the maximum downward movement of said membrane by contact therewith, means for applying respective pressures to opposite sides of said membrane whereby said membrane is displaced between said upper and lower membrane contact surfaces by a pressure differential thereacross, a member connected to said membrane for movement thereby in response to the pressure differential across said membrane, said member comprising a portion of one of said holding plates, and a proximity switch mounted on one of said housings spaced juxtaposed said member, said switch responsive to the movement of said member by said membrane to provide an output indicative of the pressure differential across said membrane.

18. A pressure sensor comprising an upper and lower housing joined to provide a chamber therebetween, a flexible membrane within said chamber having a circumferential portion clamped between the joined upper and lower housings, said lower housing including a lower membrane contact surface and said upper housing including an upper membrane contact surface arranged in spaced apart relationship forming a portion of said chamber, means for applying respective pressure to opposite sides of said membrane whereby said membrane is displaced by a pressure differential thereacross, a member connected to said membrane for movement thereby in response to the differential pressure across said membrane, and a contactless proximity switch mounted on one of said housings unconnected and spaced juxtaposed said member, said switch responsive to the movement of said member while being unconnected and spaced therefrom to provide an output indicative of the pressure differential across said membrane.

* * * * *

UNITED STATES PATENT AND TRADEMARK OFFICE
CERTIFICATE OF CORRECTION

PATENT NO. : 5,068,503
DATED : November 26, 1991
INVENTOR(S) : Sladky

It is certified that error appears in the above-identified patent and that said Letters Patent is hereby corrected as shown below:

```
Column 1, line 47, "sea" should read --seal--.
Column 1, line 65, "a" should read --an--.
Column 2, line 22, "s" should read --so--.
Column 7, line 2, "passe" should read --passes--.
Column 9, line 29, "1" should read --7--.
```

Signed and Sealed this

Twentieth Day of April, 1993

Attest:

MICHAEL K. KIRK

*Attesting Officer*   Acting Commissioner of Patents and Trademarks